LA ROY GREENMAN.
POULTRY GUARD.
APPLICATION FILED JAN. 12, 1917.

1,272,657.

Patented July 16, 1918.

Inventor

Laroy Greenman,

By

Attorney

UNITED STATES PATENT OFFICE.

LA ROY GREENMAN, OF HOLLAND, MICHIGAN.

POULTRY-GUARD.

1,272,657.    Specification of Letters Patent.    Patented July 16, 1918.

Application filed January 12, 1917. Serial No. 141,951.

*To all whom it may concern:*

Be it known that I, LA ROY GREENMAN, a citizen of the United States, residing at Holland, in the county of Ottawa and State of Michigan, have invented certain new and useful Improvements in Poultry-Guards, of which the following is a specification.

My invention relates to improvements in poultry guards, and its objects are: first, to provide a guard that will prevent a hen from sitting upon, and spoiling eggs, by holding the legs in such a position that she cannot sit down; second, to prevent poultry from flying by holding the leg in such a position that a fowl cannot properly balance itself when attempting to rise from the ground, and, third, to prevent a fowl from scratching by holding the leg so the knee joint cannot be properly bent.

Figure 1:
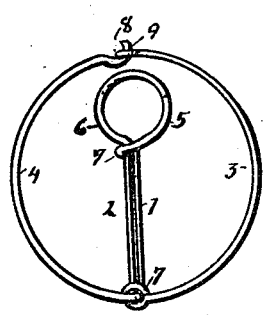
Figure 2:
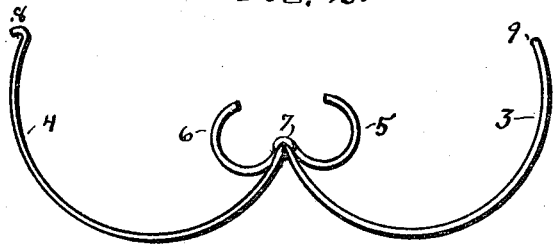
Figure 3:
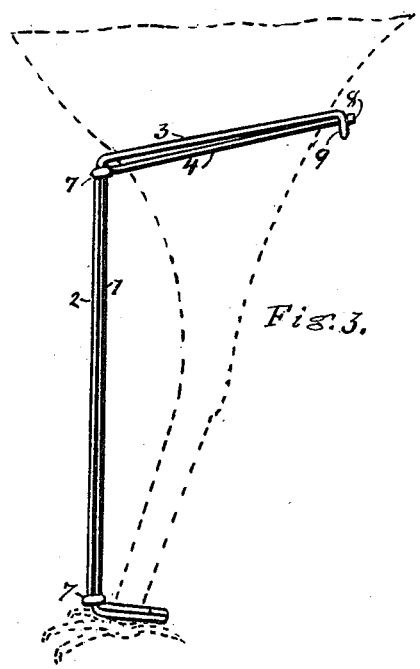
Figure 4:
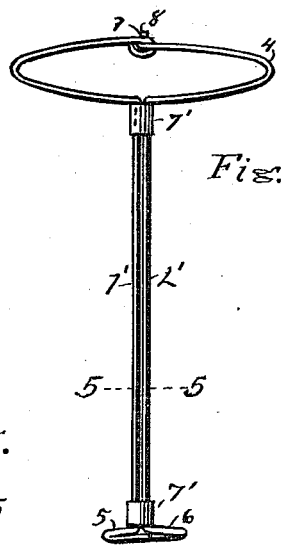
Figure 5:

It attain these objects by the use of the device shown in the accompanying drawing, in which Figure 1 is a perspective of the device detached from the fowl. Fig. 2 is a plan of the same opened preparatory to placing it onto the leg of a fowl. Fig. 3 is an elevation of the same with the leg of a fowl shown in outline. Fig. 4 is a back elevation of the same showing a modified form of hinge, or connecting element for holding the two parts of the device together and allowing them to hinge or swing readily, and, Fig. 5 is a sectional view of the device locking downwardly from the line 5—5 in Fig. 4.

Similar reference characters refer to similar parts throughout the several views.

This implement is made of two pieces of small stiff wire bent at one end to form the arms 3 and 4. The arm 3 has a loop 9 at the extreme end, and the arm 4 has a pin or hook 8 at the extreme end arranged to engage the loop 9 and form the upper circle of the implement of a proper size to fit freely over the thigh of the fowl's leg near the hip, as indicated on the dotted outlines in Fig. 3. The other ends of these wires are bent to form two curved arms 5 and 6, which when in use are made to lap by each other, and form a circle of a proper size to fit around the fowl's leg near the foot without danger of slipping off over the toes.

In constructing this implement one of the wires, say 1, is wound around the other wire, say 2, at each end, as at 7, so as to form a hinged or pivotal connection between the wires so the rings at the upper and lower ends of the implement may be opened, as in Fig. 2, and closed, as in Figs. 1, 3 and 4, or the same effect may be attained by making use of small bands, as 7', in which case it is not necessary to coil one wire around the other, as in Figs. 1, 2 and 3; or they may be otherwise connected.

When applying this implement to the leg of a fowl, the rings are opened to practically the position indicated in Fig. 2, when the rings are placed upon the leg of the fowl with the large ring or loop around the thigh, and the small ring or loop around the ankle, and the upright wires, 1 and 2, directly in front of the leg, as in Fig. 3, in such a position, and so applied, that it would be impossible for a fowl to sit down for the purpose of sitting upon eggs, to bend the knee to scratch, or to place the leg in proper position to fly. For the latter purpose it is better to use but one of the devices as it tends to more effectually unbalance the fowl than if one were placed upon each leg, though even with two in use the results are very satisfactory, as it is hard for a fowl to either scratch or fly unless it can bend to the knees, and properly exercise the legs to accommodate the necessary action of the muscles of the wings.

When the implement has been properly placed upon the fowl the arms 2 and 3 are carried to position so the outturned end, 8, of one arm may be passed through the loop 9 in the other arm and the two securely fastened together. The bringing of the ends 8 and 9 together will, as a matter of course, swing the arms 5 and 6 around the ankle of the fowl, and the implement is properly secured, as is necessary for its proper application and operation.

With the use of this implement a hen may be broken of the desire to set in two or three days, and will, as a rule, commence laying within a week or ten days.

What I claim as new, and desire to secure by Letters Patent of the United States, is:

1. In a poultry guard, two wires, each bent to form a long rigid standard having a long curved arm at one end and a short curved arm at the other end, said bodies pivotally connected, and means for interlocking the ends of the long curved arms.

2. In a poultry guard, two wires bent to form two rigid standards each having a long curved arm at one end, these arm so bent as to form a circle placed at an obtuse angle with the standards, each standard having a short curved arm at the other end arranged to form a small circle at an obtuse angle with the standards, the standards pivotally connected, and means for securing the guard on the leg of fowl.

3. In a poultry guard, wires formed to produce pivotally connected standards, long curved arms at one end of the standards and short curved arms at the other end of the standards arranged to form a large loop at one end and a small loop at the other end of the standards, the ends of the arms forming the small loop made to lap by each other, and the ends of the arms forming the large loop made to interlock, substantially as shown and described.

Signed at Grand Rapids, Michigan, January 9, 1917.

LA ROY GREENMAN.

Copies of this patent may be obtained for five cents each, by addressing the "Commissioner of Patents, Washington, D. C."